United States Patent
Dominique et al.

(10) Patent No.: US 7,809,090 B2
(45) Date of Patent: Oct. 5, 2010

(54) BLIND DATA RATE IDENTIFICATION FOR ENHANCED RECEIVERS

(75) Inventors: Francis Dominique, Rockaway, NJ (US); Hongwei Kong, Denville, NJ (US); Walid E. Nabhane, Bedminster, NJ (US); Ashok Armen Tikku, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1062 days.

(21) Appl. No.: 11/318,464

(22) Filed: Dec. 28, 2005

(65) Prior Publication Data

US 2007/0147548 A1    Jun. 28, 2007

(51) Int. Cl.
   *H04L 27/06* (2006.01)
(52) U.S. Cl. .................. 375/341; 375/316; 375/377; 370/465; 714/795
(58) Field of Classification Search .......... 375/341, 375/225, 316, 377; 714/795; 370/465
See application file for complete search history.

(56) References Cited

U.S. PATENT DOCUMENTS

| 5,327,439 | A |   | 7/1994  | Estola et al. |   |
|---|---|---|---|---|---|
| 5,375,129 | A |   | 12/1994 | Cooper |   |
| 5,396,516 | A | * | 3/1995  | Padovani et al. | ............ 375/225 |
| 5,509,020 | A |   | 4/1996  | Iwakiri et al. |   |
| 5,566,206 | A |   | 10/1996 | Butler et al. |   |
| 5,638,408 | A |   | 6/1997  | Takaki |   |
| 5,671,255 | A |   | 9/1997  | Wang et al. |   |
| 5,774,496 | A | * | 6/1998  | Butler et al. | ................. 375/225 |
| 5,796,757 | A |   | 8/1998  | Czaja |   |
| 5,917,837 | A | * | 6/1999  | Stein | ........................... 714/758 |
| 6,094,465 | A | * | 7/2000  | Stein et al. | .................... 375/346 |
| 6,097,716 | A |   | 8/2000  | Abrishamkar |   |
| 6,112,325 | A | * | 8/2000  | Burshtein | .................... 714/774 |
| 6,147,964 | A | * | 11/2000 | Black et al. | ................. 370/209 |
| 6,378,106 | B1 |   | 4/2002  | Allpress et al. |   |
| 6,581,182 | B1 |   | 6/2003  | Lee |   |
| 6,810,078 | B2 |   | 10/2004 | Bradley |   |
| 7,505,534 | B1 | * | 3/2009  | Xue et al. | .................... 375/340 |
| 2002/0110203 | A1 | * | 8/2002  | Sarkar | ........................ 375/341 |
| 2002/0167993 | A1 | * | 11/2002 | Shinoi | ........................ 375/147 |
| 2003/0182108 | A1 | * | 9/2003  | Proctor et al. | ............... 704/221 |
| 2004/0052318 | A1 | * | 3/2004  | Traeber | ....................... 375/341 |
| 2004/0081195 | A1 | * | 4/2004  | El-Maleh et al. | ............ 370/465 |

OTHER PUBLICATIONS

3$^{rd}$ Generation Partnership Project 2, "Physical Layer Standard for cdma2000 Spread Spectrum Systems," Version 6.0, Feb. 8, 2002.

* cited by examiner

*Primary Examiner*—Mohammad H Ghayour
*Assistant Examiner*—Leila Malek
(74) *Attorney, Agent, or Firm*—Harness, Dickey & Pierce, P.L.C.

(57) ABSTRACT

In a method for determining a transmitted data rate, a received data frame may be decoded using different candidate rates to generate a first decoded bit sequence associated with each candidate rate. A first frame quality indicator and a first error metric may be generated for each of the candidate rates based on the associated first decoded bit sequence and a decoding metric for the associated first decoded bit sequence. One of the candidate rates may be selected as the transmitted data rate based on the first frame quality indicators, the first error metrics and an error metric threshold.

21 Claims, 4 Drawing Sheets

BLIND DATA RATE IDENTIFICATION FOR ENHANCED RECEIVERS

BACKGROUND OF THE INVENTION

Conventional code division multiple access (CDMA) transmitters and receivers, each of which may be located at a mobile station or a base station, may exchange information using a number of radio configurations (RCs) based on different sets of forward and reverse traffic channel formats. Each RC may be characterized by physical layer parameters, such as, channel coding, spreading and modulation schemes combined with spreading rate that result in a set of transmission or candidate rates. Each set of candidate rates includes a base candidate rate and an associated set of candidate rates. For example, in RC3, the base candidate rate may be equal to 9.6 kbps and the associated set of candidate rates may include 4.8 kbps, 2.7 kbps and 1.5 kbps.

When these configurable RCs are utilized, however, CDMA receivers in mobile stations and/or base stations do not have a priori knowledge of the candidate rate used to transmit the received data. That is, for example, only the radio configuration used for the communication is available to the receivers. Accordingly, CDMA receivers must blindly determine this unknown data rate. This is referred to as blind data rate determination.

In a conventional method for blind data rate determination, a received signal is decoded using a Viterbi decoding algorithm for each of a plurality of possible candidate rates. The decoded signals are convolutionally re-encoded, and the re-encoded signal is compared with the received signal. This comparison is a straight bit-wise comparison looking for the minimum bit error rate, and adopting the rate associated with the minimum bit error rate. Cyclic Redundancy Check (CRC), if present, may be used to assist in the data rate selection.

While this conventional method may be a sufficient approximation for determining the rate at which the data was transmitted, the results of a bit-wise comparison are simply positive or negative indications of matches. Thus, problems may be encountered when a very low data rate is used because there are fewer bits per frame over which the bit-wise comparison may be taken. Additionally, a CRC is either not used (e.g., RC1) or has a smaller length (e.g., RC2 and/or RC4) for lower data rates in order to save overhead, and thus, its usefulness may be limited.

For example, in RC1, a 20 millisecond (ms), 16 bit data frame encoded with a 1.2 kbps data rate may contain only 72 bits of meaningful information over which bit wise comparisons may be made, which results in lower reliability of the data rate determination.

Moreover, conventional rate determination algorithms may have limited error detection due to, for example, the limited length of cyclic redundancy codes (CRCs) appended during the encoding process at the transmitter. That is, for example, smaller data blocks associated with lower data rates used for reducing overhead. This is especially true for small data blocks with low data rate in order to reduce overhead. As a result of this limited error detection, higher layers may force frame errors to be reported even when multiple candidate data rates have passed a CRC check. Thus, valid frames may be inadvertently erased.

SUMMARY OF THE INVENTION

Example embodiments of the present invention provide methods for selecting a transmitted data rate from a plurality of candidate rates at a receiver, for example, when a transmitter randomly and/or instantaneously chooses one from a set of data rates based on real-time traffic activity and/or when no accompanying control channel is used to inform the receiver of the specific data rate being used at any time.

Methods according to example embodiments of the present invention as described herein may be used in the receiver to recover data from this type of signaling and may generally be referred to as blind rate identification.

In a method according to an example embodiment of the present invention, a received data frame may be decoded using different candidate rates to generate a first decoded bit sequence associated with each candidate rate. A first frame quality indicator and a first error metric may be generated for each of the candidate rates based on the associated first decoded bit sequence and a decoding metric for the associated first decoded bit sequence. One of the candidate rates may be selected as the transmitted data rate based on the first frame quality indicators, the first error metrics and an error metric threshold.

In a method according to another example embodiment of the present invention, one of a plurality of candidate data rates may be selected as the transmitted data rate based on a plurality of frame quality indicators, a plurality of decoding path metrics, and an error metric threshold. Each frame quality indicator may be generated based on one of a plurality of symbols for the received data frame and each decoding path metric may be associated with one of the plurality of candidate rate.

In example embodiments of the present invention, the received data frame may be an encoded symbol sequence and/or each decoding metric may be a final path metric associated with one of the first decoded bit sequences. Each first error metric may be generated by scaling a corresponding final path metric. Each final path metric may be scaled based on a system parameter, a symbol sequence or a noise power associated with a corresponding candidate rate.

In example embodiments of the present invention, the candidate rates may be filtered based on the error metric threshold to generate a first set of candidate rates including candidate rates passing the error metric threshold. The transmitted data rate may be selected from the first set of candidate rates.

In example embodiments of the present invention, a candidate rate passes the error metric threshold if a first error metric for the candidate rate passes the error metric threshold. The first error metric passes the error metric threshold if the first error metric is less than, or equal to, the error metric threshold.

In example embodiments of the present invention, the number of candidate rates in the first set of candidate rates having acceptable frame qualities may be determined based on a first frame quality indicator associated with each candidate rate in the first set of candidate rates. If a single candidate rate in the first set of candidate rates has an acceptable frame quality, the selecting step may select the single candidate rate as the transmitted data rate. If the determining step determines that the first set of candidate rates includes at least two candidate rates having acceptable frame qualities, the selecting step may modify the received data frame to generate a modified data frame. A second frame quality indicator for each candidate rate in the first set of candidate rates may be determined, and the first set of candidate rates may be filtered based on the second frame quality indicators to generate a second set of candidate rates. The transmitted data rate may be selected from the second set of candidate rates.

In example embodiments of the present invention, the received data frame may be an encoded symbol sequence including a plurality of symbols each having an associated amplitude. In this example embodiment, absolute values of amplitudes associated with each of the symbols in the encoded symbol sequence may be compared to determine symbols having the N strongest amplitudes. The amplitude for each of the N strongest symbols may be set equal to zero. N may be a natural number.

In example embodiments of the present invention, the modified data frame may be decoded using different candidate rates in the first set of candidate rates to generate a second decoded bit sequence associated with each candidate rate in the second set of candidate rates. A second frame quality indicator may be generated for each of the candidate rates in the first set of candidate rates based on the associated second decoded bit sequence.

In example embodiments of the present invention, filtering may eliminate candidate rates in the first set of candidate rates having a second frame quality indicator indicating an unacceptable frame quality to produce the second set of candidate rates.

In example embodiments of the present invention, if a single candidate rate in the second set of candidate rates has an acceptable frame quality, the selecting step may select the transmitted data rate from the second set of candidate rates.

In example embodiments of the present invention, the modifying, the determining and the filtering steps may be repeated iteratively until a single candidate rate is determined to have an acceptable frame quality or the number of times the modifying and eliminating steps are repeated reaches a maximum. If the number of times reaches a maximum, the selecting step may select one of a candidate rate among the plurality of candidate rates having the smallest first error metric, a fixed data rate, a random data, or an erasure may be reported.

In example embodiments of the present invention, the filtering may eliminate candidate rates in the first set of candidate rates having a second frame quality indicator indicating an unacceptable frame quality to produce the second set of candidate rates. If a single candidate rate in the second set of candidate rates has an acceptable frame quality, the selecting step may select the transmitted data rate from the second set of candidate rates.

In example embodiments of the present invention, each first frame quality indicator may be a cyclic redundancy check word for an associated first decoded bit sequence and/or each error metric may be indicative of a symbol error rate for an associated candidate rate.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
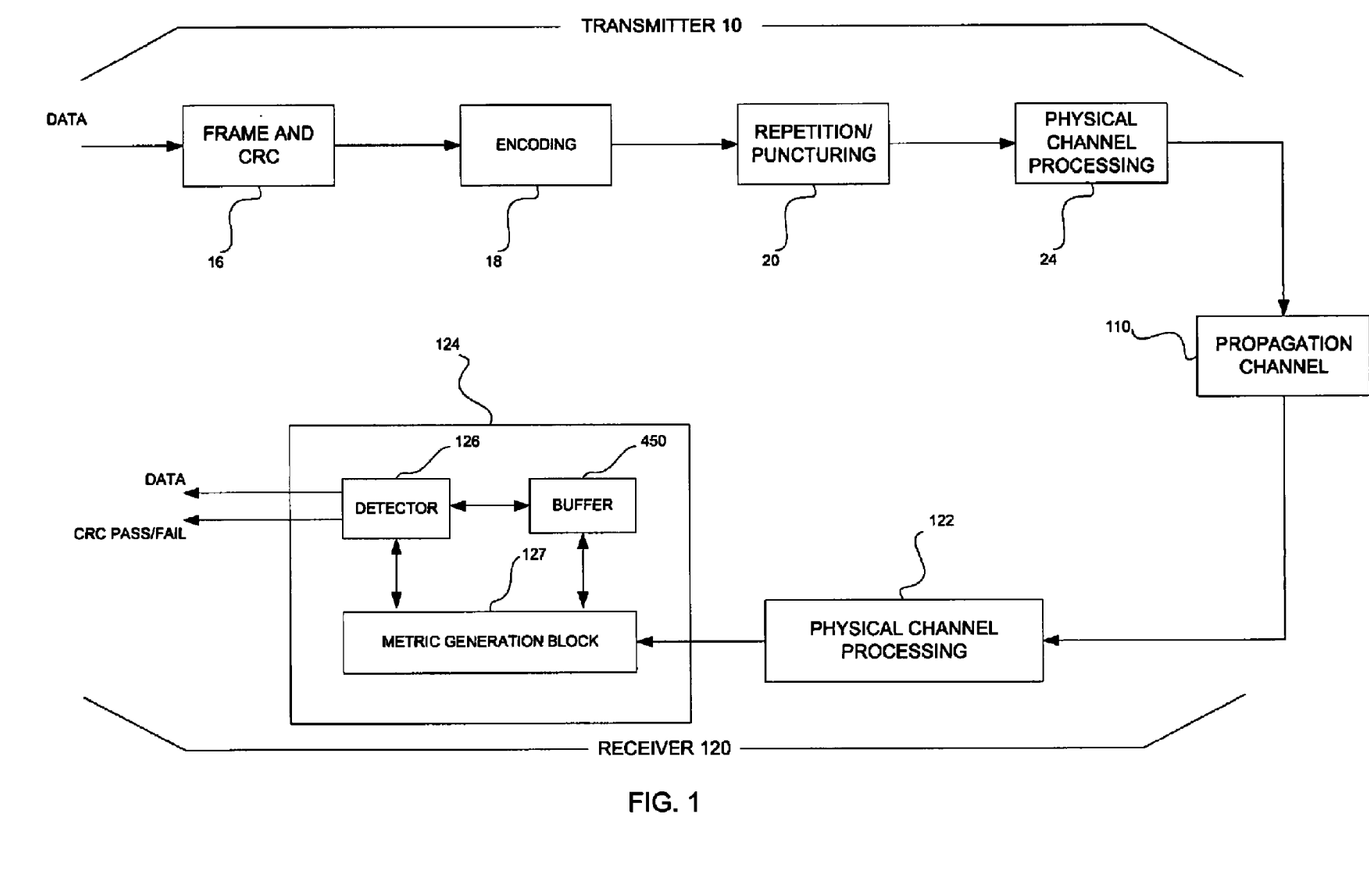
FIG. 1 is a block diagram illustrating a wireless transmitter and receiver according to an example embodiment of the present invention.

FIG. 1 illustrates a CDMA transmitter 10 and receiver 120 according to an example embodiment of the present invention. At the transmitter 10, a bit sequence representative of information (e.g., voice and/or data) may be input to a frame and CRC block 16. The frame and CRC block 16 may process the bit sequence in a known manner, and output the bit sequence partitioned into bit frames, for example, 20 ms in length and 16 bits long in RC1. Additionally, the bit sequence from the frame and CRC block 16 may have cyclic redundancy information (e.g., cyclic redundancy code (CRC) information), or any other suitable error detecting and correcting information, appended thereto. The output bit frame from the frame and CRC block 16 may have bit rates associated with a selected RC, for example, RC3 including 1.5, 2.7, 4.8 or 9.6 kilobits per second (kbps).

Alternatively, as will be appreciated by those having ordinary skill in the art, the bit frames produced by the frame and CRC block 16 may have any suitable bit rate associated with any RC and the foregoing enumerated bit rates are, therefore, to be construed as exemplary and not as limiting. The bit rate of the bit frames output from the frame and CRC block 16 may change on a frame-by-frame basis depending on various conditions within the communication system such as, for example, voice and data activity, noise, interference, multipath interference and the like.

In one example, a bit frame produced by the frame and CRC block 16 may be received by an encoding block 18, which encodes the bit frame into a data frame. That is, for example, the encoding block 18 may encode the bit sequence within the bit frame to generate an encoded symbol sequence. The encoding block 18 may be, for example, a rate 1/2 convolutional encoder or any other suitable encoder using any suitable coding scheme. As will be appreciated by those having ordinary skill in the art, the encoding block 18 may multiply the bit frame from the frame and CRC block 16 by various polynomials to encode the bit frame into a data frame.

If the encoding block 18 is a rate 1/2 encoder, for example, the data frame will have a symbol rate that is twice the bit rate of the input bit frame provided to the encoding block 18. For example, considering a 1/2 rate encoder, an input bit frame having a bit rate of, for example, 4.8 kbps may result in a data frame having a symbol rate of 9.6 kilosymbols per second (ksps).

The encoding block 18 may output the data frame to a repetition/puncturing block 20. The repetition/puncturing block 20 may generate a data frame having a symbol rate of 19.2 ksps regardless of the symbol rate of the data frame produced by the encoding block 18 by, if necessary, puncturing or repeating various ones of the encoded symbols in the data frame.

The punctured/repeated data frame may be output to a physical channel processing block 24. At the physical channel processing block 24, the punctured/repeated data frame may be interleaved and multiplied by a Walsh code. The Walsh code, as will be appreciated by one having ordinary skill in the art, may be a 64 symbol code designed to be mutually orthogonal with other Walsh codes. Accordingly, the mutually orthogonal Walsh codes enable various CDMA transmitters and receivers to occupy the same geographical space and frequency bandwidth without significantly interfering with one another.

The Walsh coded data frames may also be multiplied by various other short and long codes, which are well known to those having ordinary skill in the art. Of course, as will be readily appreciated by those having ordinary skill in the art, signals other than Walsh codes may be used.

The Walsh coded data frame may be filtered to achieve certain spectrum, and modulated with a carrier signal and up-converted to an RF signal appropriate for transmission by an antenna. For example, the Walsh coded data frame may be modulated using, for example, quadrature phase shift keying (QPSK), differential quadrature phase shift keying (DQPSK), binary phase shift keying (BPSK), quadrature amplitude modulation (QAM) or any other suitable modulation technique.

The modulated carrier signal may be up-converted to a signal having a frequency in the ranges of, for example, 450, 800, 900, 1800, 1900 megahertz (MHz) or any other suitable frequency range. The transmitter 10 may transmit the up-converted signal, which may be received at the receiver 120 via propagation path 110 (e.g., over the air).

At the receiver 120, the transmitted signal may be received using a CDMA RAKE receiver included in a physical channel processing block 122. The physical channel processing block 122 may down-convert, demodulate and de-interleave the received signal to generate a first received data frame. In one example, the physical channel processing block 122 may use maximal ratio combining techniques to generate the first received data frame, where the first received data frame includes a plurality of soft-symbols referred to as a soft-symbol sequence. The soft-symbol sequence may be an estimate of the symbol sequence included in the data frame transmitted by the transmitter 10. The received data frame may be output to a rate identification and data recovery block 124. As shown, the rate identification and data recovery block 124 may include a buffer 450, a detector 126 and a metric generation block 127, the operations of each will be discussed in more detail below.

As will be appreciated by one of ordinary skill in the art, the physical channel processing block 122 and/or the rate identification and data recovery block 124 may be implemented, for example, by way of a programmable digital signal processor (DSP), an application specific integrated circuit (ASIC), a field programmable gate array (FPGA), or any other suitable component commonly found in a conventional CDMA receiver.

As discussed above, CDMA transmitters (e.g., transmitter 10) and receivers (e.g., receiver 120) may exchange information using a number of radio configurations (RCs) based on different sets of forward and reverse traffic channel formats. Each RC may be characterized by physical layer parameters, such as, channel coding, spreading and modulation schemes combined with a spreading rate that result in a candidate rate set including a plurality of candidate rates.

Since CDMA receivers, such as, receiver 120 of FIG. 1 may not know at which candidate rate the data has been transmitted, in a method according to one or more example embodiments of the present invention, the rate identification and data recovery block 124 may blindly determine the transmitted data rate by selecting a candidate rate from a plurality of candidate rates. In doing so, the rate identification and data recovery block 124 may generate a first set of rate identification metrics associated with each candidate rate. The rate identification and data recovery block 124 may select a candidate rate from a plurality of candidate rates associated with an RC as the transmitted data rate based on the generated rate identification metrics. As discussed herein, rate identification metrics may include error metrics and frame quality indicators.

Figure 2:
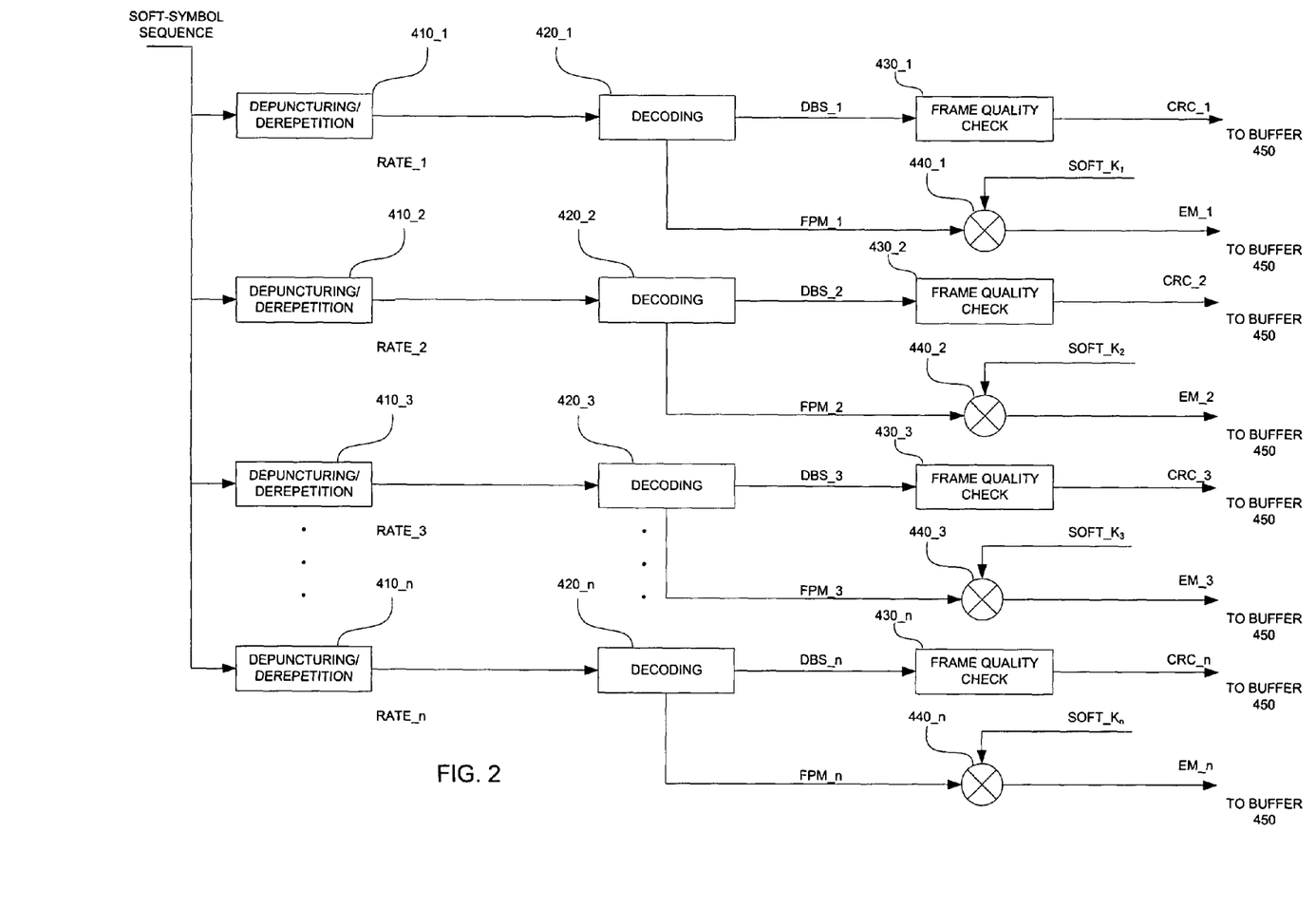
FIG. 2 illustrates a block diagram for generating rate identification metrics according to an example embodiment of the present invention.

FIG. 2 is a block diagram illustrating a structure and method for generating rate identification metrics according to an example embodiment of the present invention. The structure and method as illustrated in FIG. 2 may be included and performed at the metric generation block 127 of FIG. 1. Example embodiments of the present invention may be used in conjunction with any radio configuration (RC) including n number of candidate rates, n being any natural number.

Referring to FIG. 2, the received data frame output from the physical channel processing block 122 may be input to each of a plurality of depuncturing/derepetition blocks 410_1, 410_2, 410_3, . . . , 410_n; each of the plurality of depuncturing/derepetition blocks 410_1, 410_2, 410_3, . . . , 410_n being associated with a candidate rate in the candidate rate set.

At each depuncturing/derepetition block 410_1, 410_2, 410_3 . . . 410_n the received data frame may be depunctured or derepeated based on a corresponding candidate rate in the candidate rate set. That is, for example, at depuncturing/derepitition block 410_1, the received data frame may be depunctured or derepeated based on a first rate, such as, 9.6 kbps in RC3. Similarly, at the depuncturing/derepitition block 410_2 the received data frame may be depunctured or derepeated based on a second rate, such as, 4.8 kbps. Each depunctured/derepeated data frame may then be decoded by a corresponding decoding block 420_1, 420_2, 420_3 . . . 420_n.

The depunctured/derepeated received data frames output from depuncturing/derepetition blocks 410_1, 410_2, 410_3, . . . , 410_n may be decoded by the decoding blocks 420_1, 420_2, 420_3, . . . , 420_n, respectively, to generate first decoded bit sequences $DBS\_1$, $DBS\_2$, $DBS\_3$, . . . , $DBS\_n$ and path metrics FPM_1, FPM_2, FPM_3, . . . , FPM_n. Each first decoded bit sequences DBS_1, DBS_2, DBS_3 . . . DBS_n and path metrics FPM_1, FPM_2, FPM_3 . . . FPM_n may be associated with a candidate rate in the candidate rate set.

In one or more example embodiments of the present invention, each decoding block 420_1, 420_2, 420_3 . . . 420_n may be a convolutional code decoder, such as, a Viterbi decoder. A Viterbi decoder may use a Viterbi decoding algorithm, which is a known decoding algorithm that computes individual branch metrics, which connect with one another to form a possible sequence or path of transmitted bits. The sum of the branch metrics yields what is referred to as path metric for the code word it represents. The final (winning) path metric is associated with a path representative of the "most likely" sequence of transmitted bits. In example embodiments of the present invention, this most likely sequence of bits output by each decoding block 420_1, 420_2, 420_3 . . . 420_n may be used as the first decoded bit sequences DBS_1, DBS_2, DBS_3 . . . DBS_n, respectively. In addition, the final path metrics associated with the first decoded bit sequence DBS_1, DBS_2, DBS_3 . . . DBS_n may be used as the first path metrics FPM_1, FPM_2, FPM_3 . . . FPM_n, respectively.

Referring still to FIG. 2, decoding blocks 420_1, 420_2, 420_3, . . . , 420_n may output the first decoded bit sequences DBS_1, DBS_2, DBS_3, . . . , DBS_n to frame quality check blocks 430_1, 430_2, 430_3, . . . ,430_n, respectively. The decoding blocks 420_1, 420_2, 420_3 . . . 420_n may also output the first path metrics FPM_1, FPM_2, FPM_3 . . . FPM_n to combiners 440_1, 440_2, 440_3 . . . 440_n, respectively.

Each frame quality check block 430_1, 430_2, 430_3, . . . , 430_n may perform a first frame quality check on one of the first decoded bit sequences DBS_1, DBS_2, DBS_3, . . . , DBS_n, respectively. The frame quality check blocks 430_1, 430_2, 430_3, . . . 430_n may then output first frame quality indicators CRC_1, CRC_2, CRC_3, . . . CRC_n, respectively, indicating whether the corresponding first decoded bit sequence DBS_1, DBS_2, DBS_3, . . . , DBS_n pass the corresponding frame quality check.

In one example, each frame quality check performed by the frame quality check blocks 430_1, 430_2, 430_3 . . . 430_n may be a CRC check as is well-known in the art. In this example, the first frame quality indicators CRC_1, CRC_2, CRC_3, . . . , CRC_n may be CRC check bits indicating an acceptable frame quality (e.g., a CRC pass), hereinafter referred to as a frame quality pass, or an unacceptable frame quality (e.g., a CRC fail), hereinafter referred to as a frame quality fail. This frame quality pass or frame quality fail may be represented by a single bit. For example, if the first decoded bit sequence DBS_1 passes the first frame quality check, the frame quality check block 430_1 may output a frame quality indicator bit having a value of '1'. On the other hand, if the first decoded bit sequence fails the first frame quality check, the frame quality check block 430_1 may output a frame quality indicator bit having a value of '0'. The frame quality indicator bit output from the frame quality check block 430_1 along with the associated candidate rate may be stored in the buffer 450 of FIG. 1. If a CRC is not present (e.g., in RC1 ), the frame quality indicator may always indicate an acceptable frame quality.

Each of the first frame quality indicators CRC_2, CRC_3 . . . CRC_n may be generated in the same manner as frame quality indicator CRC_1 and may be stored in the buffer 450. Thus, a detailed discussion of generating these frame quality indicators will be omitted for the sake of brevity.

Still referring to FIG. 2, combiners 440_1, 440_2, 440_3 . . . 440_n may receive and scale path metrics FPM_1, FPM_2, FPM_3 . . . FPM_n to generate error metrics EM_1, EM_2, EM_3 . . . EMA_4, respectively. Each error metric EM_1, EM_2, EM_3 . . . EM_4 may be associated with a candidate rate in the candidate rate set.

Each combiner 440_1, 440_2, 440_3, . . . ,440_n may scale a respective path metric FPM_1, FPM_2, FPM_3, . . . , FPM_n by combining a received path metric FPM_1, FPM_2, FPM_3, . . . , FPM_n with a scaling factor soft_$k_i$ (for i=1, 2, 3, . . . n) corresponding to a respective one of the candidate rates in the candidate rate set. The scaling factor soft_$k_i$ may be given by Equation (1) shown below:

$$\text{soft\_k}_i = \frac{1}{\text{linear\_domain\_traffic\_to\_pilot\_ratio\_for\_rate\_i}} \quad \text{Equation (1)}$$

In example embodiments of the present invention, each soft_$k_i$ (for i=1, 2, 3 . . . n) may be a system parameter, which may be set through, for example, human operator intervention. Alternatively, example embodiments of the present invention may use other values as soft_$k_i$, such as, given by equation (2) shown below:

$$\text{soft\_k}_i = \frac{1}{\text{coded\_sequence\_length\_for\_rate\_i}} \quad \text{Equation (2)}$$

In equation (2) shown above, coded_sequence_length_for_rate_i is the symbol sequence length associated with each candidate rate in the candidate rate set. In another alternative, values for soft_$k_i$ may be given by Equation (3) shown below:

$$\text{soft\_k}_i = \frac{1}{\text{noise\_power\_for\_rate\_i}} \quad \text{Equation (3)}$$

In equation (3), the noise_power_for_rate_i may be the sum of the squared channel estimates for candidate rate i in the candidate rate set used to generate the soft-symbol sequence at the physical channel processing block 122. This may be the sum of channel estimates for all active fingers of the above described RAKE receiver and all active symbols in the received data frame.

Regardless of the manner in which soft_$k_i$ is determined, soft_$k_i$ may be different for each candidate rate i for i=1, 2, 3 . . . n. In one or more example embodiments of the present invention, the error metrics EM_1, EM_2, EM_3 . . . EM_4 may be soft error metrics. In one example, each error metric EM_1, EM_2, EM_3 . . . EM_4 may be an unquantized version of a symbol error rate (SER) associated with a respective candidate rate in the candidate rate set. These soft error metrics may be referred to as soft SERs.

Figure 3:
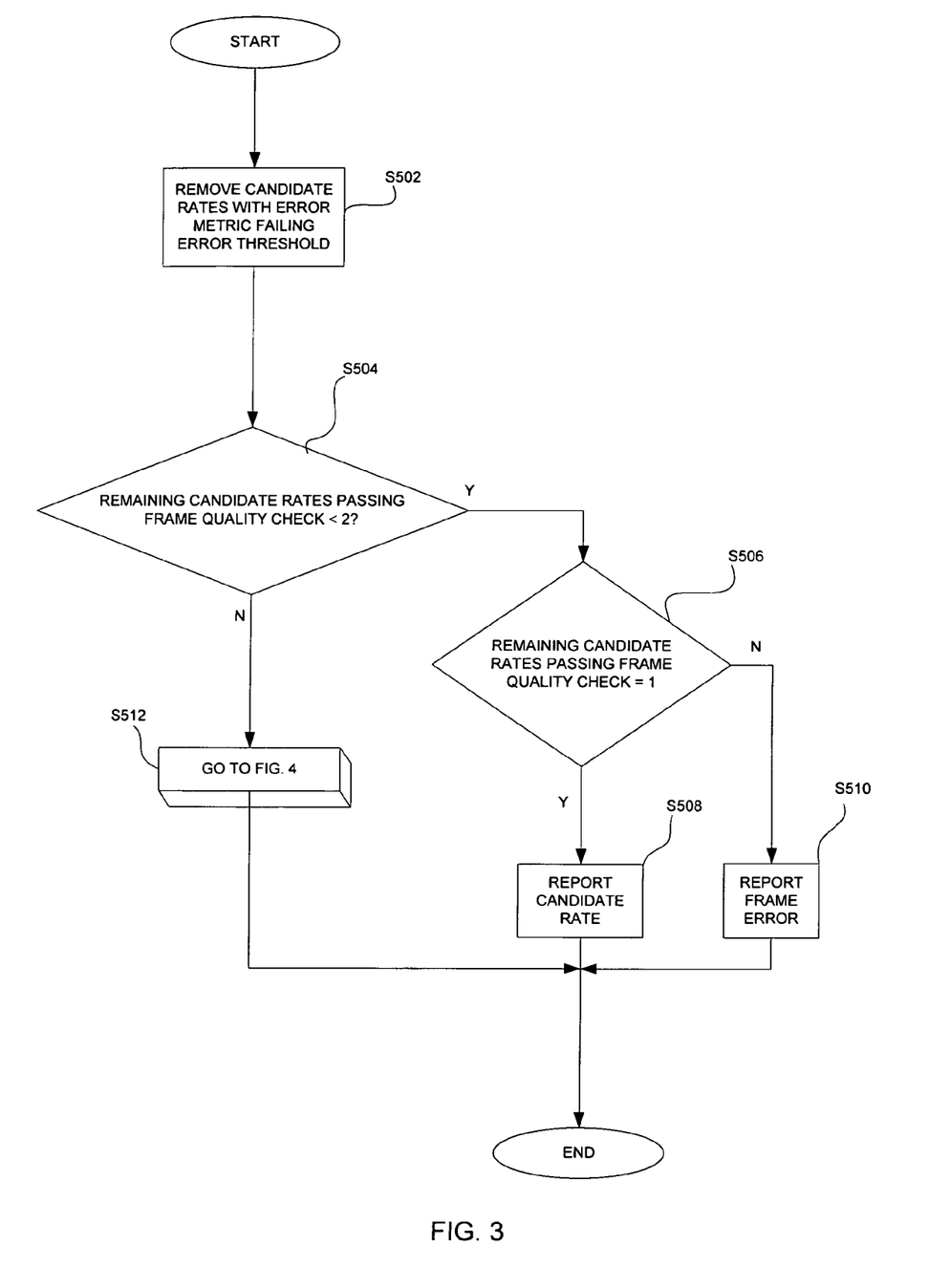
FIG. 3 is a flow chart illustrating a method for selecting a transmitted data rate according to an example embodiment of the present invention.
Figure 4:
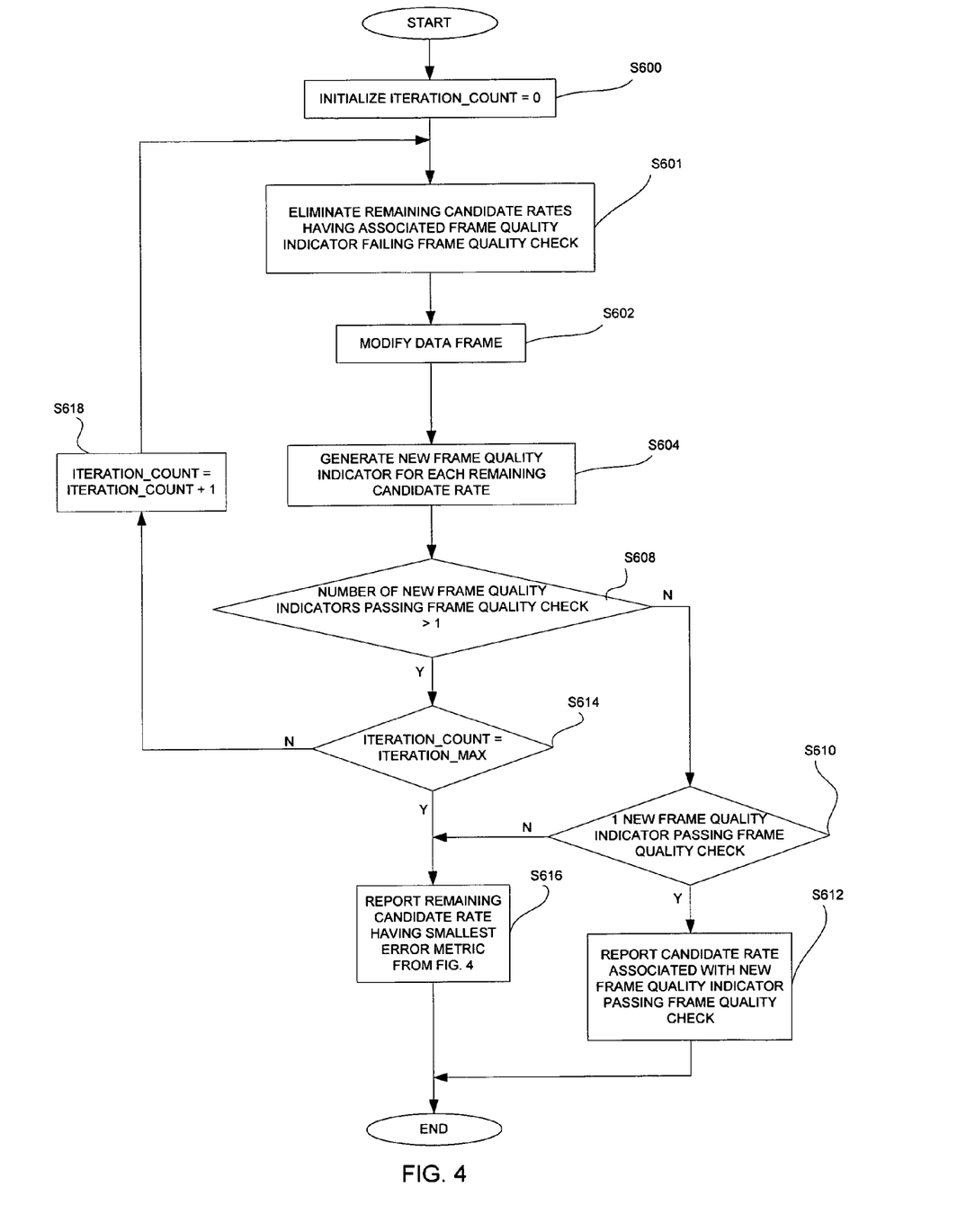
FIG. 4 is a flow chart illustrating a method for eliminating candidate rates as possible transmitted data rates according to an example embodiment of the present invention.

FIGS. 3 and 4 are flow charts illustrating a method for determining a transmitted data rate according to an example embodiment of the present invention. The method as illustrated in FIGS. 3 and 4 may be performed at the detector 126 of FIG. 1.

In one or more example embodiments of the present invention, the transmitted data rate may be selected from a plurality of candidate rates included in a candidate rate set. The candidate rate set may be associated with an RC used for transmitting and receiving data between a transmitter, such as, transmitter 10 of FIG. 1 and a receiver, such as, receiver 120 of FIG. 1.

For example purposes, FIGS. 3 and 4 will be discussed with regard to candidate rates associated with RC3, however, it will be understood that example embodiments of the present invention may be utilized in conjunction with any suitable RC. As noted above, RC3 includes four candidate rates hereinafter referred to as RATE_1, RATE_2, RATE_3 and RATE_4, respectively, and thus, for example purposes FIGS. 3 and 4 will be discussed with respect to n=4. That is, in this example, error metrics EM_1, EM_2, EM_3 and EM_4, and first frame quality indicators CRC_1, CRC_2, CRC_3 and CRC_4 may be generated and, along with their associated candidate rates, stored in the buffer 450.

Referring to FIG. 3, at step S502, candidate rates RATE_1, RATE_2, RATE_3 and RATE_4 may be filtered based on corresponding first error metrics EM_1, EM_2, EM_3, EM_4 and an error threshold.

For example, each of the error metrics EM_1, EM_2, EM_3 and EM_4 stored in the buffer 450 may be compared to an error threshold to determine whether the associated candidate rates RATE_1, RATE_2, RATE_3 and/or RATE_4 pass the error threshold. If an error metric EM_1, EM_2, EM_3 and/or EM_4 fails the error threshold, the associated candidate rate may be eliminated or removed from the buffer 450, and thus, eliminated or removed as a possible transmitted data rate.

In one or more example embodiments of the present invention, a candidate rate (e.g., RATE_1, RATE_2, RATE_3 and/or RATE_4 ) fails the error threshold if an associated error metric (e.g., error metric EM_1, $_{EM\_}$2, EM_3 and/or EM_4 ) is greater than the error threshold. On the other hand, a candidate rate passes the error threshold if the value of an associated error metric is less than or equal to the value of the error threshold. In this example, the candidate rates remaining in the buffer 450 after filtering may be referred to as a first set of candidate rates.

As discussed above, in one or more example embodiments the error metrics EM_1, EM_2, EM_3 and EM_4 may be soft SERs associated with candidate rates RATE_1, RATE_2, RATE_3 and RATE_4, respectively. In this example, the error threshold may be an SER threshold as is well-known in the art.

Returning to FIG. 3, at step S504, the detector 126 may determine how many candidate rates in the first set of candidate rates have associated first frame quality indicators indicating a frame quality pass. That is, how many first frame quality indicators CRC_1, CRC_2, CRC_3 and CRC_4 remaining in buffer 450 indicate a frame quality pass.

If one or less first frame quality indicators remaining in the buffer 450 indicate a frame quality pass, at step S504, and if no frame quality indictors indicating a frame quality pass remain in the buffer 450 at step S506, the first set of candidate rates is determined to include zero candidate rates passing the first frame quality check. The detector 126 may then report a frame error at step S510.

Returning to step S506, if a single first frame quality indicator remaining in the buffer 450 indicates a frame quality pass, the first set of candidate rates is determined to include a single candidate rate passing the first frame quality check, and the detector 126 may select the candidate rate associated with the first frame quality indicator remaining in the buffer 450 as the transmitted data rate at step S508.

Returning to step S504, if two or more first frame quality indicators remaining in the buffer 450 indicate a frame quality pass, the first set of candidate rates may be determined to include two or more candidate rates passing the first frame quality check and the method proceeds to step S512. At step S512, the detector 126 may perform a method according to another example embodiment of the present invention as illustrated in FIG. 4.

Referring to FIG. 4, at step S600, a value ITERATION_COUNT of a counter may be initialized to zero. The counter may count the number of iterations the method illustrated in FIG. 4 is performed.

At step S601, candidate rates having associated first frame quality indicators indicating a frame quality fail may be eliminated or removed as possible transmitted data rates. The candidate rates associated with first frame quality indicators remaining in the buffer 450 may be referred to as a second set of candidate rates.

At step S602, the received data frame may be modified to generate a first modified data frame. As discussed above, the received data frame may include a plurality of soft-symbols. Each of the plurality of soft-symbols may have a corresponding amplitude or strength.

The received data frame may be modified by zeroing out the strongest N amplitudes associated with soft-symbols in the received data frame. As discussed herein the amplitude associated with each soft-symbol in the received data frame is the absolute value of the soft-symbol. An example modification of the received data frame is discussed in detail below.

For purposes of this example, assume the received data frame includes 12 soft-symbols $s_0, s_1, s_2 \ldots s_{11}$ having amplitudes: $s_0=1.25$, $s_1=2.25$, $s_2=1.25$, $s_3=-5.75$, $s_4=-6.75$, $s_5=3.25$, $s_6=3.5$, $s_7=-0.5$, $s_8=-0.25$, $s_9=0.25$, $s_{10}=0.0$, $s_{11}=0.5$, where the subscripts indicate the order or sequence in which the soft-symbols were received.

From inspection of the soft-symbols and associated amplitudes, the strongest soft-symbol is $s_4$ as it has the largest absolute value $|s_4|=6.75$. Assuming the number of soft-symbols N to zero out is 2, for example, the soft-symbols $s_3$ and $s_4$ may be replaced with zeros. This replacement produces, in step S602, a first modified data frame $s_0=1.25$, $s_1=2.25$, $s_2=1.25$, $s_3=0.0$, $s_4=0.0$, $s_5=3.25$, $s_6=3.5$, $s_7=-0.5$, $s_8=-0.25$, $s_9=0.25$, $s_{10}=0.0$, $s_{11}=0.5$.

Returning to FIG. 4, at step S604, a second frame quality indicator may be generated for each candidate rate remaining in the buffer 450. The second frame quality indicators may be generated in the same manner used to generate the first frame quality indicators as discussed above with regard to FIG. 2; however, the second frame quality indicators may be generated based on the first modified data frame. The second frame quality indicators may also be stored in buffer 450 along with their associated candidate rate.

Returning to FIG. 4, at step S608, the detector 126 may determine how many second frame quality indicators indicate a frame quality pass. That is, how many candidate rates in the second set of candidate rates have an associated second frame quality indicator indicating a frame quality pass.

If a single second frame quality indicator in the buffer 450 indicates a frame quality pass, at step S610, the candidate rate associated with the second frame quality indicator may be selected as the transmitted data rate at step S612.

Returning to step S610, if no second frame quality indicators stored in the buffer 450 indicate a frame quality pass, the candidate rate associated with the smallest error metric remaining in the buffer 450 may be selected as the transmitted data rate at step S616.

Returning to step S608, if two or more second frame quality indicators stored in buffer 450 indicate a frame quality pass, the value ITERATION_COUNT may be compared to a set value ITERATION_MAX at step S614. If ITERATION_COUNT is equal to ITERATION_MAX, the candidate rate associated with the smallest error metric remaining in the buffer 450 may be selected as the transmitted data rate at step S616. If multiple (e.g., two or more) error metrics remaining in the buffer 450 have the same smallest value, the detector 126 may select the lowest associated data rate, a fixed data rate, a data rate randomly chosen from the remaining candidate data rates, or simply report an erasure.

Returning to step S614, if the value ITERATION_COUNT is not equal to ITERATION_MAX, the counter value ITERATION_COUNT may be incremented by one, and the method may proceed to step S601 and repeat.

The process illustrated in FIG. 4 may be repeated iteratively until a single candidate rate has an associated frame quality indicator passing the frame quality check, or the counter value ITERATION_COUNT equals the value ITERATION_MAX.

Example embodiments of the present invention may reduce false detection probabilities, for example, to below $10^{-5}$ when there are multiple frame quality or CRC passes. Example embodiments of the present invention have been described with regard to RC3 of a CDMA2000 reverse link; however, it will be understood that example embodiments of the present invention are equally applicable to both 3GPP2 and 3GPP networks.

In example embodiments of the present invention applied to 3GPP2 and 3GPP networks, blocks, such as, spreading/despreading, scrambling/descrambling, modulation/demodulation, multiplexing/de-multiplexing and interleaving/deinterleaving may be included in the physical channel processing block. In addition, the number of data rates and the actual values of data rates vary from standard to standard, and thus, example embodiments of the present invention may be used in conjunction with any suitable data rate and/or number of data rates.

The scaled path metric or error metric, as described herein, may represent an unquantized version of the conventional SER metric. This soft SER metric may be have improved quality and may simplify conventional implementations by requiring little or no additional circuitry to be generated.

Although described herein with regard to a CDMA communication system, example embodiments of the present invention may be used in 3GPP2 and/or 3GPP systems for latency-critical applications such as voice and/or short messaging.

Example embodiments of the present invention provide methods, which may reduce erroneous determination or selection of transmitted data rates without inadvertently erasing data frames.

Methods according to one or more example embodiments of the present invention may be utilized alone or in conjunction with conventional methods for blind data rate determination. For example, rate identification metrics generated using, for example, a method as illustrated in FIG. 2 may be used in conjunction with conventional rate determination methods. In addition, or alternatively, the methods for determining a transmitted data rate, according to an example embodiment of the present invention, for example, as illustrated in FIGS. 3 and/or 4 may be used in conjunction with conventional SER metrics and CRC indicators.

Example embodiments of the present invention being thus described, it will be obvious that the same may be varied in many ways. Such variations are not to be regarded as a departure from the invention, and all such modifications are intended to be included within the scope of the invention.

We claim:

1. A method for selecting, by a receiver, one of a plurality of candidate rates as a transmitted data rate, the method comprising:
    decoding, by the receiver, a received data frame using different candidate rates to generate a first decoded bit sequence associated with each candidate rate;
    generating, by the receiver, a first frame quality indicator and a first error metric for each of the candidate rates based on the associated first decoded bit sequence and a decoding metric for the associated first decoded bit sequence;
    filtering, by the receiver, the candidate rates based on the first error metrics and an error metric threshold to generate a first set of candidate rates including candidate rates having associated first error metrics passing the error metric threshold; and
    selecting, by the receiver, a candidate rate among the first set of candidate rates as the transmitted data rate based on at least the first frame quality indicators and, if the first set of candidate rates includes at least two candidate rates having acceptable frame qualities, the selecting further includes,
        modifying the received data frame to generate a modified data frame,
        determining a second frame quality indicator for each candidate rate in the first set of candidate rates based on the modified data frame,
        filtering the first set of candidate rates based on the second frame quality indicators to generate a second set of candidate rates, and
        selecting the transmitted data rate from the second set of candidate rates.

2. The method of claim 1, wherein the received data frame is an encoded symbol sequence.

3. The method of claim 2, wherein each decoding metric is a final path metric associated with one of the first decoded bit sequences.

4. The method of claim 2, wherein each first error metric is generated by scaling a corresponding final path metric.

5. The method of claim 4, wherein each final path metric is scaled based on a system parameter, a symbol sequence or a noise power associated with a corresponding candidate rate.

6. The method of claim 1, wherein a candidate rate passes the error metric threshold if a first error metric for the candidate rate passes the error metric threshold.

7. The method of claim 6, wherein the first error metric passes the error metric threshold if the first error metric is less than or equal to the error metric threshold.

8. The method of claim 1, further comprising:
    determining a number of candidate rates in the first set of candidate rates having acceptable frame qualities based on a first frame quality indicator associated with each candidate rate in the first set of candidate rates.

9. The method of claim 8, wherein if a single candidate rate in the first set of candidate rates has an acceptable frame quality, the selecting step selects the single candidate rate as the transmitted data rate.

10. The method of claim 8, wherein the received data frame is an encoded symbol sequence including a plurality of symbols each having an associated amplitude, and the modifying step further comprises:
    comparing absolute values of amplitudes associated with each of the symbols in the encoded symbol sequence to determine symbols having the N strongest amplitudes; and
    setting the amplitude for each of the N strongest symbols equal to zero, where N is a natural number.

11. The method of claim 10, wherein the determining the second frame quality indicator further comprises:
    decoding the modified data frame using different candidate rates in the first set of candidate rates to generate a second decoded bit sequence associated with each candidate rate in the first set of candidate rates; and
    generating the second frame quality indicator for each of the candidate rates in the first set of candidate rates based on the associated second decoded bit sequence.

12. The method of claim 11, wherein the filtering the first set of candidate rates eliminates candidate rates in the first set of candidate rates having a second frame quality indicator indicating an unacceptable frame quality to produce the second set of candidate rates.

13. The method of claim 12, wherein if a single candidate rate in the second set of candidate rates has an acceptable frame quality, then the selecting step selects the transmitted data rate from the second set of candidate rates.

14. The method of claim 12, wherein the modifying, the determining and the filtering steps are repeated iteratively until a single candidate rate is determined to have an acceptable frame quality or the number of times the modifying and eliminating steps are repeated reaches a maximum.

15. The method of claim 14, wherein if the number of times reaches a maximum, the selecting step selects one of a candidate rate among the plurality of candidate rates having the smallest first error metric, a fixed data rate, a random data rate, or reports an erasure.

16. The method of claim 8, wherein the filtering the first set of candidate rates eliminates eliminates candidate rates in the first set of candidate rates having a second frame quality indicator indicating an unacceptable frame quality to produce the second set of candidate rates.

17. The method of claim 8, wherein if a single candidate rate in the second set of candidate rates has an acceptable frame quality, the selecting step selects the transmitted data rate from the second set of candidate rates.

18. The method of claim 8, wherein the modifying, the determining and the filtering steps are repeated iteratively until a single candidate rate is determined to have an acceptable frame quality or the number of times the modifying and eliminating steps are repeated reaches a maximum, and if the number of times reaches a maximum, the selecting step selects one of a candidate rate among the plurality of candidate rates having the smallest first error metric, a fixed data rate, a random data rate, or reports an erasure.

19. The method of claim 1, wherein each first frame quality indicator is a cyclic redundancy check bit for an associated first decoded bit sequence.

20. The method of claim 1, wherein each error metric is indicative of a symbol error rate for an associated candidate rate.

21. A method for selecting, by a receiver, a transmitted data rate from a plurality of candidate data rates, the method comprising:

filtering, by the receiver, the plurality of candidate rates based on a plurality of error metrics and an error metric threshold to generate a first set of candidate rates including candidate rates having associated error metrics passing the error metric threshold, each of the plurality of error metrics being associated with one of the plurality of candidate rates; and selecting a candidate rate from among candidate rates in the first set of candidate rates as the transmitted data rate based on at least a plurality of first frame quality indicators, each first frame quality indicator being generated based on one of a plurality of symbols for a received data frame, and each first frame quality indicator being associated with one of the candidate rates in the first set of candidate rates and, if the first set of candidate rates includes at least two candidate rates having acceptable frame qualities, the selecting step further includes, modifying the received data frame to generate a modified data frame, determining a second frame quality indicator for each candidate rate in the first set of candidate rates based on the modified data frame;

filtering the first set of candidate rates based on the second frame quality indicators to generate a second set of candidate rates, and selecting the transmitted data rate from the second set of candidate rates.

\* \* \* \* \*